United States Patent [19]
Mallinson

[11] 3,750,706
[45] Aug. 7, 1973

[54] VALVES FOR CONTROLLING THE SUPPLY OF DRINKING WATER TO POULTRY AND OTHER LIVESTOCK

[76] Inventor: Ronald Ingham Mallinson, Marten, Rebroyd, Triangle, near Halifax, Yorkshire, England

[22] Filed: June 24, 1971

[21] Appl. No.: 156,395

[30] Foreign Application Priority Data
July 1, 1970 Great Britain.................. 31,820/70

[52] U.S. Cl............ 137/614.18, 119/72.5, 251/145, 251/366
[51] Int. Cl............................. A01k 7/02, F16k 1/00
[58] Field of Search..................... 251/338, 339, 366, 251/145; 119/75, 72.5; 137/614.18

[56] References Cited
UNITED STATES PATENTS
3,477,471  11/1969  Mallinson .......................... 119/72.5
3,483,847  12/1969  Kneubuel .............................. 119/75

*Primary Examiner*—Arnold Rosenthal
*Attorney*—A. A. Saffitz

[57] ABSTRACT

A valve for controlling the supply of drinking water to poultry having a body of moulded plastic incorporating two valves, one upper and one lower, the lower seat comprising the upper end of a tube moulded in the body and the upper seat being formed by the plastic material of the valve body.

1 Claim, 3 Drawing Figures

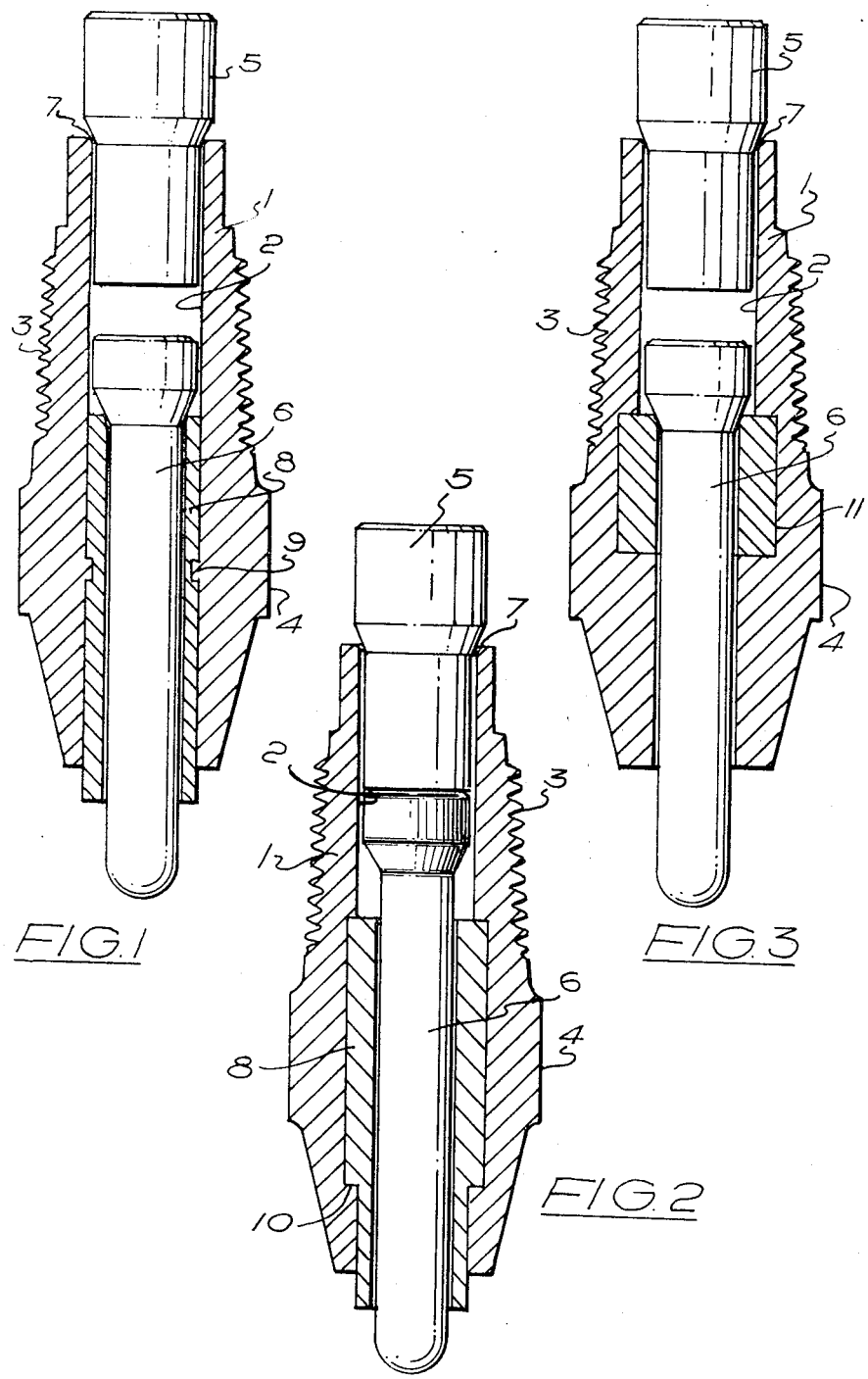

VALVES FOR CONTROLLING THE SUPPLY OF DRINKING WATER TO POULTRY AND OTHER LIVESTOCK

This invention relates to valves for controlling the supply of drinking water to poultry and other livestock.

An object of the present invention is to provide a new or improved construction of valve which is cheap to manufacture.

According to the invention the valve comprises a body of moulded plastic and incorporates two valve seats, one upper and one lower the lower seat comprising the upper end of a tube secured or moulded in the body.

Alternatively the lower seat may consist of a metal rind moulded or inserted in the valve body. The upper valve seat may be constituted by the upper edge of the valve body.

In order that the invention may be clearly understood and readily carried into effect, the same will now be more fully described with reference to and by the aid of the accompanying drawings, wherein FIG. 1 is a sectional elevation of a valve constructed in accordance with the invention and FIGS. 2 and 3 are similar views to FIG. 1 but showing alternative embodiments.

Referring to the drawings, the valve comprises a body 1 of moulded synthetic material having a through bore 2. Externally the body is screw threaded at 3 and formed with flats 4 to facilitate insertion in a water pipe (not shown).

The valve body contains two valve members, an upper member 5 and a lower member 6 and the seat for the upper member 5 is the upper edge 7 of the valve body, whilst the seat for the lower member 6 is the upper end of a stainless steel tube 8 moulded in to the valve body.

The stainless steel tube 8 may be recessed at 9 (FIG. 1) to secure a not sliding fit in the body 1 or be stepped at 10 (FIG. 2) for the same purpose. The upper valve member 5 is shown in FIG. 2 in its raised, i.e., its unseated position, as is the valve member 6, the valve member 5 having been raised to this position by upward movement of the valve member 6 due to the poultry or other livestock forcing upwardly the downwardly depending stem of said valve member 6. When the upward force on the stem of valve member 6 is released, the lower valve member 6 and hence the upper valve member 5 move downwardly within the body 1 so that the median tapered portions of the valve members 6 and 5 come to rest respectively on the seat 7 and the seat provided by the upper end of stainless steel tube 8. Thus the valve is closed so that water cannot pass therethrough.

The inwardly recessed portion of the body 1, serves to adapt moulding immobilisation of the stainless steel sleeve 8 within the lower bore portion of the body 1, the stepped portion 10 of the stainless steel sleeve 8 resting on and being retained in the body 1 by the lower extremity of said recesses.

Instead of a stainless steel tube 8 a stainless steel ring may be inserted (see FIG. 3).

I claim:

1. A valve for controlling the supply of drinking water to poultry and other livestock comprising:

an elongated tubular body of moulded plastics material having a longitudinal bore and incorporating two valve seats, an upper valve seat integrally formed as a top rim with said tubular body, for an upper valve member and a lower valve seat for a lower valve member and having a recessed portion at its lower bore portion for securing a stainless steel sleeve for forming said lower valve seat;

said upper valve member, of generally cylindrical shape, having an upper portion which has a larger diameter than the diameter of the bore of said tubular body and a lower portion which is of smaller diameter than the upper portion and slightly less than the diameter of the bore of said tubular body, said upper valve member having an inwardly tapered median seat portion between the upper and lower portions thereof which seats onto the said integrally formed top rim of said tubular body;

said lower (seat) valve member within the said tubular body having an enlarged upper portion of an inwardly tapered median portion;

the lower valve seat for said lower valve member being constituted by a stainless steel sleeve located within said tubular body and encircling the lower portion of said lower valve member;

said stainless steel sleeve having a lower portion of smaller outside diameter than an upper portion thereof, said lower portion of said stainless steel sleeve extending below the lower extremity of said tubular body;

said upper portion of said stainless steel sleeve being located in an inwardly recessed portion of said tubular body so as to immobilise the stainless steel sleeve;

said upper valve member being moved from its seat by upward movement of the lower valve member when the lower portion of the lower valve member is moved upwardly by the poultry or other livestock so as to allow passage of drinking water through the valve.

* * * * *